US 11,081,980 B2

(12) United States Patent
Owen

(10) Patent No.: US 11,081,980 B2
(45) Date of Patent: Aug. 3, 2021

(54) ENERGY STORAGE AND CONVERSION

(71) Applicant: IONECH LIMITED, London (GB)

(72) Inventor: Nathan Owen, Pool (GB)

(73) Assignee: IONECH LIMITED, London (GB)

(*) Notice: Subject to any disclaimer, the term of this patent is extended or adjusted under 35 U.S.C. 154(b) by 143 days.

(21) Appl. No.: 16/492,576

(22) PCT Filed: Mar. 9, 2018

(86) PCT No.: PCT/GB2018/050599
§ 371 (c)(1),
(2) Date: Sep. 9, 2019

(87) PCT Pub. No.: WO2018/162917
PCT Pub. Date: Sep. 13, 2018

(65) Prior Publication Data
US 2021/0143760 A1 May 13, 2021

(30) Foreign Application Priority Data
Mar. 9, 2017 (GB) ...................................... 1703802

(51) Int. Cl.
H02N 3/00 (2006.01)
(52) U.S. Cl.
CPC ..................... H02N 3/00 (2013.01)
(58) Field of Classification Search
CPC ...................................................... H02N 3/00
(Continued)

(56) References Cited

U.S. PATENT DOCUMENTS 2,210,918 A * 8/1940 Karlovitz ............... H02K 44/08
310/308
3,411,025 A * 11/1968 Marks ...................... H02N 3/00
310/11
(Continued)

FOREIGN PATENT DOCUMENTS

JP 462466 1/1971
JP 57160373 10/1982
(Continued)

OTHER PUBLICATIONS

Japan Notice of Refusal for corresponding Japanese Patent Application No. 2019-571115 dated Oct. 6, 2020, 7 pages.
(Continued)

Primary Examiner — Pedro J Cuevas
(74) Attorney, Agent, or Firm — Lee & Hayes, P.C.

(57) ABSTRACT

A device for converting kinetic energy of a fluid to electrical energy is disclosed. The device comprises a flow chamber having an inlet port for a fluid and an exhaust port for the fluid. A pair of charge collecting electrodes is spaced apart from each other along a collection direction and disposed within the flow chamber. An electric field generator is configured to generate an electric field in the flow chamber along a field direction to separate charged species in the fluid. A flow path of the fluid between the inlet port and the exhaust port may have a flow direction with a component along the first direction and a component along the second direction. Also disclosed is a system comprising the device and a related method. The disclosure may find application, for example, in providing a source of energy for an electric vehicle.

20 Claims, 3 Drawing Sheets

(58) Field of Classification Search
USPC .......................................... 290/1 R; 376/144
See application file for complete search history.

(56) References Cited

U.S. PATENT DOCUMENTS

| | | | | |
|---|---|---|---|---|
| 3,501,376 A * | 3/1970 | Dow | ................ | H01J 25/42 376/144 |
| 3,518,461 A * | 6/1970 | Marks | ................ | H02N 3/00 310/10 |
| 3,527,992 A * | 9/1970 | Bright | ................ | H02N 3/00 318/116 |
| 3,582,694 A * | 6/1971 | Gourdine | ................ | H02N 3/00 310/10 |
| 3,660,700 A * | 5/1972 | Aisenberg | ................ | H02K 44/18 310/11 |
| 3,792,293 A * | 2/1974 | Marks | ................ | H02N 3/00 310/308 |
| 4,023,065 A * | 5/1977 | Koloc | ................ | H05H 1/04 376/144 |
| 4,891,180 A * | 1/1990 | Koloc | ................ | H05H 1/04 376/144 |
| 5,015,432 A * | 5/1991 | Koloc | ................ | H05H 1/54 376/148 |
| 5,041,760 A * | 8/1991 | Koloc | ................ | H05H 1/48 315/111.41 |
| 5,160,694 A * | 11/1992 | Steudtner | ................ | G21B 1/05 376/107 |
| 5,923,716 A * | 7/1999 | Meacham | ................ | G21B 1/00 376/121 |
| 6,440,600 B1 * | 8/2002 | Starzak | ................ | H01M 14/00 429/122 |
| 6,628,740 B2 * | 9/2003 | Monkhorst | ................ | G21B 1/11 376/147 |
| 6,888,907 B2 * | 5/2005 | Monkhorst | ................ | G21B 1/11 376/147 |
| 6,894,446 B2 * | 5/2005 | Monkhorst | ................ | G21B 1/052 315/502 |
| 7,478,712 B2 * | 1/2009 | McGowen | ................ | H02N 11/002 191/45 R |
| 8,421,047 B2 * | 4/2013 | Carmein | ................ | H02N 3/00 250/573 |
| 8,502,181 B2 * | 8/2013 | Carmein | ................ | H02N 3/00 250/573 |
| 8,680,696 B2 * | 3/2014 | Mikus | ................ | F22B 1/18 290/1 R |
| 8,779,404 B2 * | 7/2014 | Carmein | ................ | H02N 3/00 250/573 |
| 8,878,150 B2 * | 11/2014 | Carmein | ................ | H02N 3/00 250/573 |
| 9,413,274 B2 * | 8/2016 | Stahl | ................ | H02N 3/00 |
| 2009/0218910 A1 * | 9/2009 | Carmein | ................ | H02N 3/00 310/309 |
| 2012/0310030 A1 * | 12/2012 | Fontbonne | ................ | H01J 47/02 600/1 |
| 2013/0015257 A1 * | 1/2013 | Kalra | ................ | B05B 5/0255 239/3 |
| 2018/0106243 A1 * | 4/2018 | Knoll | ................ | H02K 44/10 |

FOREIGN PATENT DOCUMENTS

| | | |
|---|---|---|
| JP | 2003250285 | 9/2003 |
| WO | WO2012054503 | 4/2012 |

OTHER PUBLICATIONS

GB Examination Report for corresponding GB Patent Application No. GB1703802.7 dated Apr. 11, 2019, 2 pages.
PCT Search Report from corresponding PCT Application No. PCT/GB108/050599 dated May 15, 2018, 8 pages.

* cited by examiner

ENERGY STORAGE AND CONVERSION

This Application is a US National Phase application filed under 35 § 371 of PCT Application PCTGB2018050599 filed Mar. 9, 2018, which claims priority to GB Application 1703802.7, filed Mar. 9, 2017, which is incorporated herein by reference.

This disclosure relates to the storage and conversion of energy, specifically converting energy in the form of kinetic or potential energy in a fluid, for example a gas, into electric energy.

BACKGROUND

Most energy storage solutions at a portable scale involve storage of energy in chemical form in a battery or fuel cell to convert the stored energy to electrical energy at a time when it is needed. Much active research is undertaken to develop and improve batteries and fuel cells to address such issues as limited cycle life of batteries and safety of use of fuel cells.

Storage of energy in the form of potential (pressure) energy in a gas or liquid is also known. For example, it is known to use electricity during times of low demand to pump water to a higher potential and to allow the pumped water to fall through an electricity generating turbine during times of high demand. Similarly, storage of energy in a gas at constant pressure (e.g. undersea storage) or constant volume (e.g. underground storage) is also known. However, those forms of energy storage require large-scale installations and complex arrangements including turbines and electric machines to convert the stored energy to electrical energy.

There is a continuous need for improved or alternative forms of energy storage, in particular although not exclusively at a scale that is portable, for example so that they can be installed in an electric vehicle.

SUMMARY

In a first aspect, a device for converting kinetic energy of a fluid to electrical energy comprises a flow chamber having an inlet port for a fluid and an exhaust port for the fluid. A pair of charge collecting electrodes is spaced apart from each other along a collection direction and disposed within the flow chamber. An electric field generator is configured to generate an electric field in the flow chamber along a field direction to separate charged species in the fluid. A flow path of the fluid between the inlet port and the exhaust port has a flow direction with a component along the collection direction and a component along the field direction.

A first one of positive and negative charged species separated by the electric field is biased by the electric field to move generally in the same direction as the fluid flow as a result of the charge separation and a second one of the positive and negative charged species is biased by the electric field to move generally in a direction opposed to the direction of fluid flow (i.e. resulting in a, respectively, positive and negative scalar product between the directions of field induced movement and the direction of flow). Since the flow may affect the charged species differentially, an additional charge separation in addition to that caused by the electric field results between the collection electrodes, hence converting the kinetic energy of fluid flow (resulting, for example from the potential energy of a pressure in a pressurised fluid vessel) to electrical energy that can be dissipated in a load. In the case of a ionised gas or other fluids that have different mobilities of charged species, one of the charged species may be influenced more by the fluid flow (e.g. gas ions) than the other (e.g. electrons). As a result, the species more susceptible to the flow will be preferentially leaving the flow chamber through the exhaust, while the other species will preferentially be captured by its corresponding capture electrode, therefore increasing the potential difference between the capture electrodes and providing electrical energy associated with the excess charge.

It will be appreciated that were theories of operation are described in this disclosure, these are presented for the purpose of illustration and not to limit the scope of the disclosure.

In some embodiments, the electric field is an ionising electric field to ionise the fluid. The fluid may be a gas, such as air, Argon or Neon, and ionising the fluid may comprise generating a plasma and/or electrical discharge, for example a dark discharge or corona discharge in the flow chamber. In such embodiments, one of the charged species are electrons stripped of the gas molecules and the other charged species are the resulting positively charged gas ions. In particular, the fluid flow may affect the charged ions more than the free electrons, so that differentially more charged ions than electrons leave the flow chamber by means of the fluid flow, thereby increasing the charge separation and hence electric potential between the collector electrodes. In other embodiments, the fluid may be a liquid, for example with positively and negatively charged ions in solution.

In some embodiments, the electric field generator comprises a pair of field generating electrodes spaced apart along the field direction and disposed on either side of the flow chamber. The field generating electrodes may in some embodiments be provided by the charge generating electrodes. In other embodiments, the field generating electrodes may be separate from the charge collecting electrodes and may be electrically isolated from the flow chamber. The field generating electrodes may be driven by any suitable voltage source, for example any high voltage (HV) supply, for instance comprising a battery as power source. A suitable voltage source may additionally or alternatively comprise a HV capacitor.

In some embodiments, the field and flow directions may be substantially parallel, as may be the collection and flow directions. Advantageously, this may maximise the effect of the fluid flow, although an effect will be present as long as there is a non-zero scalar product between the flow direction and the field and/or collection direction. In some embodiments, an angle between the field and flow directions and/or an angle between the collection and flow direction may be between –n and n degrees or between 180–n and 180+n degrees, wherein n is less than 45 degrees, for example less than 30, 20 or 10 degrees. In some embodiments, n may be less than 5 degrees. In some embodiments, the field and collection directions may be substantially parallel. In some embodiments, the flow path passes through one or both of the charge collecting electrodes. For example, the charge collecting electrodes may be mesh electrodes. The charge collection electrodes may be centred on an axis coinciding with at least a portion of the flow path.

In a second aspect, a system for converting kinetic energy of a fluid to electric energy comprises a device as described above. The system further comprises a current limited voltage supply to generate the ionising electric field and a load connected to one of the charge collecting electrodes. In some embodiments, the load may be connected to that electrode which is at a lower potential (i.e. the combined field generating and charge collecting electrode collected to the negative terminal of the supply or the charge collecting electrode adjacent the field generating electrode connected to the negative terminal of the supply), which may in some embodiments provide improved efficiency, for example where the fluid is an ionised gas. For example, the load may be connected between one of the charge collecting electrodes and a ground potential. The other one of the charge collecting electrodes may be connected to the ground potential. In some embodiment the load may be connected to a charge collecting electrodes in a floating arrangement. The load may be connected on one side to one charge collecting electrode and on the other side to the other. One side of the load and the corresponding charge collecting electrode may be connected to ground.

In some embodiments, the system comprises a connector for connecting the inlet port to a container containing pressurised fluid. The container may be removably connected to the connector to enable an empty container to be replaced with a fresh container containing pressurised fluid. The container may be installed in the system in a fixed relationship with the device and may be refillable with pressurised fluid, for example via a refill port.

In some embodiments, the system comprises a controller to regulate a rate of flow of the fluid. The controller may be configured to receive a quantity indicative of energy dissipated by the load and to regulate a rate of flow of the fluid as a function of the quantity indicative of energy dissipated by the load. Additionally or alternatively, the controller may be configured to receive a quantity indicative of energy demand by the load and to regulate a rate of flow of the fluid as a function of the quantity indicative of energy demand by the load. The quantity indicative of energy dissipated may be a dissipated power, current drawn by the load, voltage drop across the load or a combination of these. The quantity indicative of energy demand may be a desired power, current to be drawn by the load, voltage to drop across the load or a combination of these, speed or torque demand if the load is a motor, etc. The controller may control a valve to control fluid flow and some or all of the controller may be provided on or in association with the pressurised fluid container and may be removable together with the container.

The load may be an electric motor, for example installed in an electric vehicle, such as an electric or hybrid car, bicycle, tricycle, ship, train or airplane. The load may comprise an electricity supply network, for example a utility substation or an electricity supply network of one or more commercial or residential units, such as one or more houses, apartments or the like.

In a third aspect, a method of converting kinetic energy of a fluid to electric energy comprises causing the fluid to flow through a flow chamber along a flow direction. The fluid may be pressurised and causing the fluid to flow may cause conversion of the potential energy in the pressurised fluid to kinetic energy of the flowing fluid. An electric field is applied to the fluid flowing in the flow chamber. The electric field has a field direction with a component along the flow direction. As a result, positive and negative species of the fluid are separated along the field direction with one of the positive and negative charged species being biased to move in a direction having a component in the flow direction and the other one of the positive and negative charged species being biased to move in a direction having a component in a direction opposite the flow direction. Each of the positive and negative charged species are collected at a respective current collector and a current is drawn from one of the current collectors to provide electrical energy to a load.

In some embodiments, the method comprises ionising the fluid, for example a gas, by applying the electric field to the flowing fluid to produce an ionised fluid comprising the negative and positive charged species. Ionising the fluid may comprise one or more of generating a plasma and causing a discharge, for example a dark or corona discharge.

In some embodiments, the method comprises sensing a quantity indicative of energy dissipated by the load and regulating a rate of flow of the fluid as a function of the quantity indicative of energy dissipated by the load. Alternatively or additionally, the method may comprise receiving a quantity indicative of energy demand by the load and regulating a rate of flow of the fluid as a function of the quantity indicative of energy demand by the load.

A fourth aspect relates to an electric vehicle comprising a device and/or system as described herein. A fifth aspect relates to an electricity supply network comprising a device and/or system as described herein.

Further aspects and embodiments are disclosed, in which the flow path of the fluid between the inlet port and the exhaust port may have a flow direction with a component in any direction relative to the collection direction and field direction, for example perpendicular to one or both of the first and second directions, rather than being limited to having a flow direction with a component along the collection direction and a component along the field direction.

In any of the described aspects and embodiments, the scalar product of the flow direction and the field direction may be negative, that is the electric field acts to accelerate the negatively charged species, for example electrons, generally in the same direction as the direction of fluid flow, while the fluid flow will counteract the action of the electric field for positive charged species, for example the positive gas ions. This may provide a larger effect due to the larger influence of fluid flow on ion movement than on electron movement and the fluid flow keeping at least a fraction of the positive ions from reaching the negative collection electrode. In other embodiments, the scalar product of the flow direction and the field direction may be positive and the electric field may act to accelerate the positive charged species, for example gas ions, generally in the same direction as the direction of fluid flow.

It will be understood that a first direction being generally along a second direction, or having a component along the second direction is equivalent to there being a non-zero scalar product between respective vectors along the first and second directions (or, by way of short-hand, between the two directions), or that the two directions are not perpendicular and hence have an angle of between zero and less than 90 degrees or between more than 90 degrees and 180 degrees between them (or, depending on the sense in which the angle is measured, between 180 degrees and less than 270 degrees or between more than 270 degrees and 360 degrees).

The fluid may be a gas, for example air, Argon or Neon. Argon or Neon, advantageously, are chemically inert and their charged ions can safely be released to the atmosphere. The same applies to other inert gasses, which may be used in other embodiments.

Embodiments that use non-inert gases, such as air containing oxygen and nitrogen, may comprise the use of a capture device capturing and/or decharging ions in the fluid leaving the exhaust port to avoid emitting toxic gasses into the atmosphere. It will of course be appreciated that other embodiments, for example those using inert gases may also comprise the use of such a capture device.

BRIEF DESCRIPTION OF THE DRAWINGS

Embodiments are now described by way of example and illustration with reference to the accompanying drawings in which like reference numerals refer to like elements and in which.

DETAILED DESCRIPTION OF EMBODIMENTS

Figure 1:
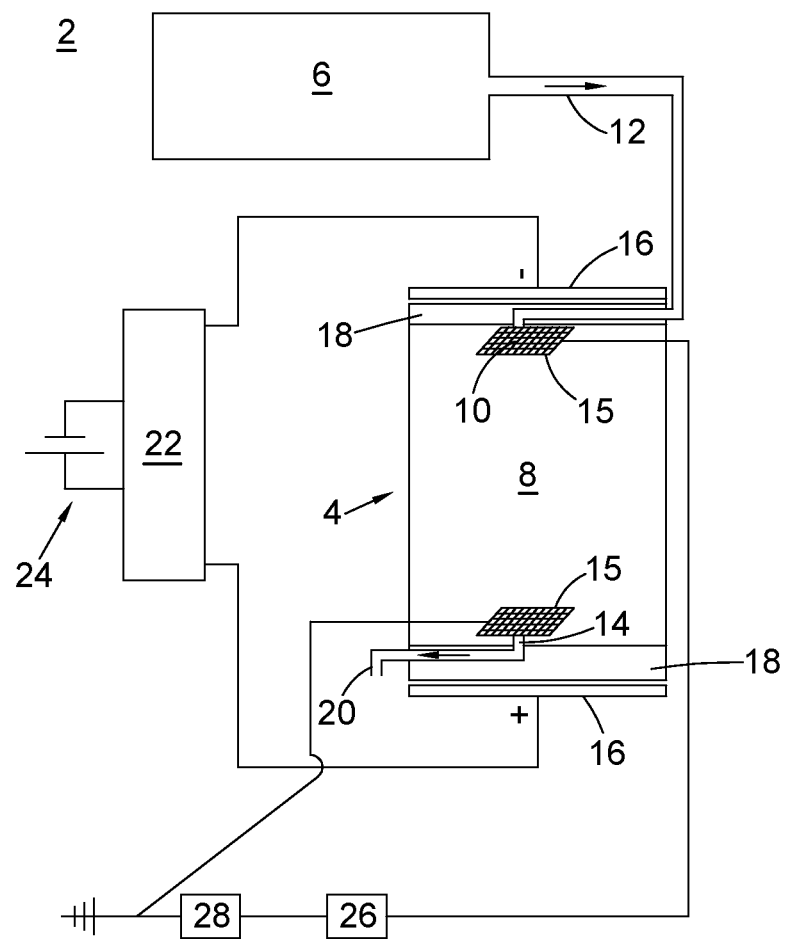
FIG. 1 illustrates an embodiment of an energy storage and conversion system comprising a device for converting fluid flow kinetic energy to electrical energy.

With reference to FIG. 1, a system 2 for converting energy stored in a compressed fluid comprises an energy conversion device 4 connected to a reservoir 6 of compressed fluid, for example a compressed fluid container. The fluid is in some embodiments a gas, for example an inert gas such as Argon or Neon. A flow chamber 8 comprises a fluid inlet port 10 connected to the reservoir 6 by a conduit 12 at one end and a fluid exhaust port 14 at another, opposed end. Respective current collecting mesh electrodes 15 are provided at each end so that fluid flow from/through the inlet and exhaust ports 10, 14 flows through the mesh electrodes. In some embodiments, the ports extend through or are flush with their respective electrode 15. In some embodiments, other electrode geometries may be employed, for example a ring electrode around the respective port or disposed adjacent to it, a point electrode disposed adjacent its respective port, etc. The electrodes 15 may be configured the same or may each be different from the other with any combination of the disclosed or other geometries.

A pair of field generating electrodes 16 is spaced apart with the flow chamber 8 in between, with each electrode adjacent a respective one of the inlet and exhaust ports 10, 14. A dielectric material 18 is disposed between each field generating electrode 16 and an adjacent end of the flow chamber 8. In some embodiments, the dielectric material 18 is a solid, in other embodiments it is air or any other suitable dielectric. The field generating electrodes 16 are thus electrically isolated form the flow chamber 8. In some embodiments, the conduit 12 connects to the flow chamber 8 through the dielectric material 18 and/or an exhaust conduit 20 is connected to the exhaust port 14 through the dielectric material 18. The exhaust conduit 20 is in some embodiments connected fluidically to the surrounding atmosphere, directly or indirectly through an exhaust ion trap.

A high voltage, current limited supply 22 is connected to the field generating electrodes 16 to generate an electric field of sufficient strength inside the flow chamber 8 to separate charged species in the fluid. In some embodiments, the field is of sufficient strength to ionise the fluid. For example, the potential difference applied between the field generating electrodes by the supply may be such as to generate a field strength of 6000V/cm or larger to ionise Argon as the flowing fluid. A lower field strength is required for some fluids, such as Neon (600 V/cm) while a higher field strength would be required for other fluids, for example air (30 kV/cm). The supply 22 is fed from a source 24 of electrical energy, for example a dc source such as a battery, for example a 12V battery. In some embodiments, the supply 22 is configured to limit current so as to draw less than 2 A from the battery (or other source of input current) in some embodiments. In some embodiments, the current in the circuit connected to the supply (output current) may also be limited, for example to less than 2 A. In some embodiments, the output current was found to be limited by the breakdown current when the chamber 8 is filled with air and a spark occurs, which in some embodiments was found to be in a range around 50 too 100 mA. In some embodiments, the input voltage to the supply may vary, for example between 9 and 12V. In some embodiments, the supply 22 and source 24 are replaced with a high voltage capacitor that has previously been charged up by any suitable source.

A step down converter 26 is connected to one, in some embodiments the lower potential one, in others the higher potential one (as illustrated), of the charge collecting electrodes 15 to step the potential difference between the electrodes 6 down to a required working voltage for a load 28 connected to the step down converter 26 in order to draw current from the step down converter 26 and hence the device 4. The load 28 is connected between the charge collecting electrode 15 in question and, in some embodiments, one side of the load and the corresponding current collecting electrode are connected to ground. In other embodiments the load 28 is connected between the charge collecting electrodes 15 in a floating arrangement. In some embodiments, the load 28 is connected between ground and one of the charge and the other one of the charge collecting electrodes is also connected to ground.

In some specific embodiments, the charge collecting electrodes 15 have an area of 1 cm$^2$ and are spaced 1.6 cm apart, with the field generating electrodes having an area of 5 cm$^2$ and spaced 7 cm apart. The flow chamber has a length of 7 cm and an internal volume of 34 cm$^3$, with the flow rate at 0.1 ml/minute ($1.7 \times 10^{-3}$ ml/s) by the flow resistance of conduits and ports 10, 12, 14, 20, and in particular by a relatively small flow cross-section/relatively high hydrodynamic resistance of the exhaust port 14, for a pressure in the reservoir of 10 bar.

Figure 2:
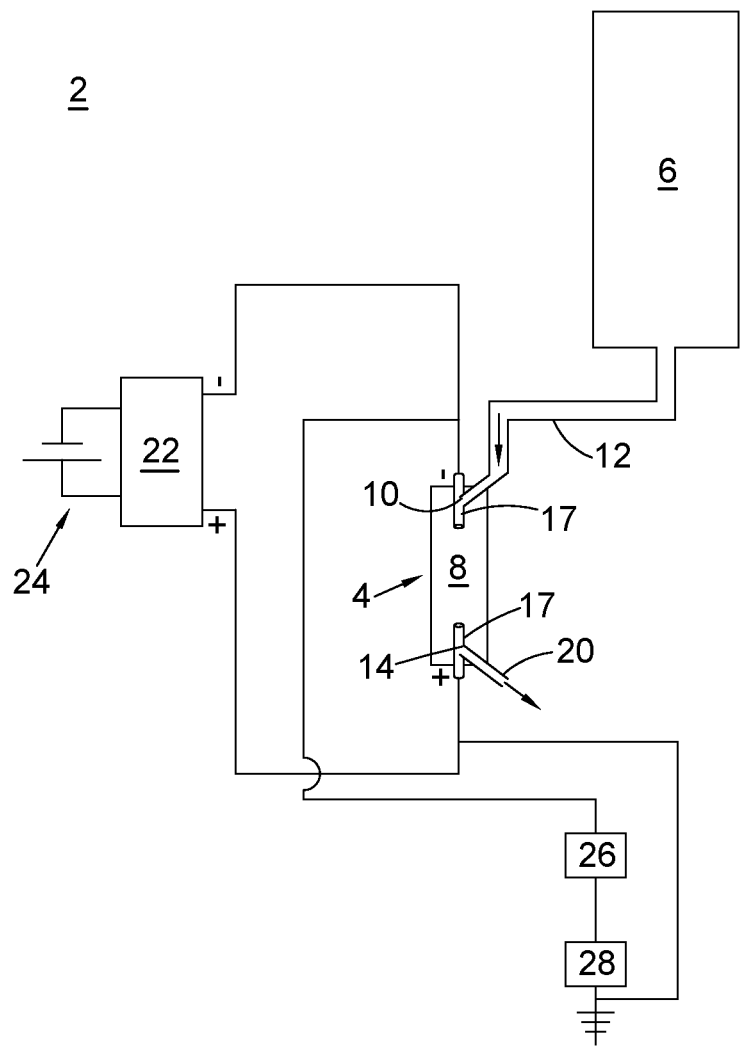
FIG. 2 illustrates an alternative embodiment of an energy storage and conversion system comprising a device for converting fluid flow kinetic energy to electrical energy.

With reference to FIG. 2, in some embodiments, now described with reference to like reference numerals for like elements, the device 4 is arranged similarly to the device 4 described above with reference to FIG. 1 but with the field and collection electrodes 15, 16 replaced with combined field and collection electrodes 17 disposed within the flow chamber 8 at respective ends of the flow chamber 8 and connected to the supply 22. In some specific embodiments, the electrodes 17 are configured as a tubular electrode, with each electrode having its axis aligned along a common direction. In some embodiments, the inlet and exhaust ports 10, 14 are disposed in a side of a respective one of the electrodes 17. In some embodiments, the supply 22 is configured to prevent or strongly limit current corresponding to electrons flowing into a positive terminal of the supply 22, for example by means of a diode associated with the positive terminal of the supply 22.

The combined field and collection electrodes 17 are connected to respective terminals of the supply 22. The step down converter 26 is connected to one of the electrodes 17 in parallel with the supply 22 (which limits or blocks current flows from that electrode 17 back to the supply as described above) and the load 28 is connected to the step down converter 26. Specifically, the step down converter 26 and load 28 are connected between the electrodes 17. In some embodiments, one side of the load and one of the electrodes 17 are connected to ground. In some embodiments, the load is connected between one of the electrodes 17 (for example the lower potential one) and ground, with the other one of the electrodes 17 connected to ground to complete the circuit.

Figure 3:
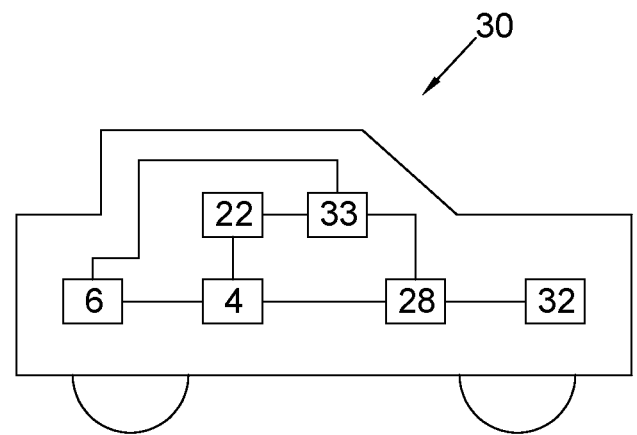
FIG. 3 illustrates an electric vehicle including the system of FIG. 1 or 2.

With reference to FIG. 3, an electric vehicle 30, for example an electric car, incorporates the reservoir 6 connected to an energy conversion device 4 as described above. The energy conversion device 4 is connected to the supply 22 and the load 28 as described above. The load 28 is an electric motor coupled to a drive train 32 of the vehicle for causing movement of the vehicle, for example driving wheels of the vehicle. In some embodiments, the energy stored in the pressurised fluid 6 in the reservoir is the sole source of energy to cause locomotion of the vehicle. The reservoir 6 is, in some embodiments, removably connected to the device 4 and can be exchanged against a full reservoir when empty. In other embodiments, the reservoir 6, whether removable/exchangeable or not, can be refilled with pressurised fluid through a refill port in the electric vehicle 30.

A controller 33 receives inputs from one or more of a vehicle driver interface (for example demand speed or torque), the load/motor 28 (for example current demand, actual current) and the reservoir 6 (for example pressure in the reservoir, as measured by pressure and/or flow sensors associated with the reservoir, for example) and controls the supply 22, specifically the voltage across electrodes 16 or 17, as the case may be, and a valve (not shown) regulating the flow of fluid from the reservoir 6 to the device 4. The controller 33, in accordance with specific embodiments controls the applied voltage and flow based on a suitable control law, for example using negative feedback to regulate current, flux, torque output or speed of the motor. For example, the field strength (i.e. voltage applied to electrodes 15/17) may be controlled based on power demand, with the field strength being increased with power demand. It will be appreciated that a suitable controller implementing a suitable control law is, in some embodiments, incorporated as described with reference to FIG. 3 in the embodiments of FIGS. 1 and 2, i.e. irrespective of the specific application. Of course, it will be appreciated that the specific control law implemented, and the sensed or received and controlled quantities will vary from one application to the next.

Figure 4:
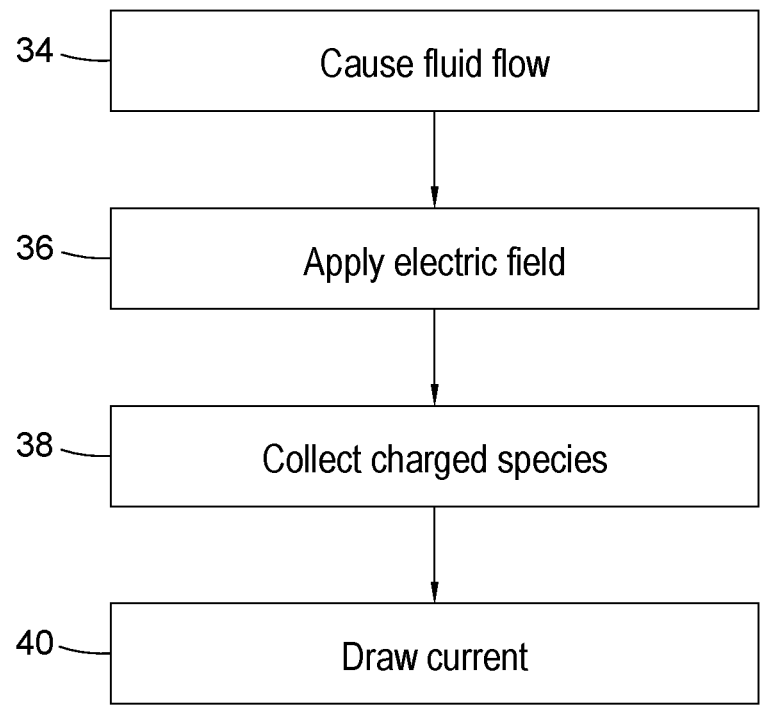
FIG. 4 illustrate a method of converting fluid flow kinetic energy to electrical energy.

With reference to FIG. 4, a method of operating the energy storage and conversion system is now described. Fluid flow from the reservoir 6 to the device 4 is caused at step 34 and at step 36 an electric field is applied to electrodes 16/17 to separate charged species in the fluid. In embodiments in which the fluid is a gas, the gas is ionised by the electric field. For example, in some embodiments, the electric field cause a dark or a corona discharge in the gas. In some embodiments, the fluid is caused to flow along the direction of the electric field, depending on the geometry of the device 4. At step 38, the charged species (either inherent in the fluid or generated by ionisation, for example gas ions and electrons), are collected by the collection electrodes 16. The charged species may affected differentially by the fluid flow due to, for example, the mobility of each species and/or the arrangements of electrodes relative to the flow. As a result, one of the charged species may preferentially leave the device 4 through the exhaust port 20 and the other one of the charged species may preferentially be collected by a corresponding electrode 15/17, as the case may be. As a result, due to the flow of fluid, the potential difference between electrodes 15/17 may be increased beyond that which it is would be otherwise and the corresponding excess charge can be drawn as current by the load 28 to do electrical work at step 40.

As described above, either or both of the fluid flow at step 34 (for example via a valve) or applied electric field at step 36 (for example via a voltage setting for the supply 22) may be controlled on the basis of one or more sensed or received parameters, in some embodiments. A sensed parameter may be indicative of energy dissipated by the load and a received parameter may be indicative of energy demand by the load. Control may further be based on sensed parameters like the pressure in the reservoir 6. Additionally, the voltage by the supply 22 is controlled, for example as described above based on power demand, to provide a field strength sufficient to ionise the fluid in the case of embodiments in which the fluid is a gas and for the device 4 to be able to supply the power demanded. The voltage may in some embodiments vary with time. For example, in some embodiments, a higher voltage is initially provided by the supply 22 until a discharge occurs in the gas and/or a plasma is generated and the voltage is then reduced to a lower level sufficient to maintain the discharge or plasma. Control of the field strength may be based on feedback, a time protocol or both to achieve efficient use of the fluid and meeting power demands.

The flow rate may be controlled to be substantially constant to the extent achievable, for example as the pressure inside the reservoir 6 varies and/or based demand or actual power dissipated in the load (or a related measure—see above). The controller may, in some embodiments, respond to power demand/power dissipated by increasing the flow rate and/or supply voltage. In addition or alternatively, in some embodiments the controller controls the pressure inside the flow chamber 8, for example in response to a signal from a pressure sensor inside the flow chamber 8. Flow rate and/or pressure may be controlled by controlling the flow resistance of the inlet conduit and port 12, 10 on the one hand and/or the flow resistance of the exhaust conduit and port 14, 20 on the other hand. For example, in some embodiments, a throttle valve may be provided in either or both of the conduits 12, 14 and/or the ports 10, 20 may have a variable aperture. In some embodiments, the throttle valve and/or variable aperture, as the case may be, are under the control of the controller, for example to control flow rate and/or pressure as described above.

It will be appreciated that the described control aspects are applicable to all embodiments described, including those described above with reference to FIG. 1, 2 or 3.

In some embodiments, the direction of flow and the field direction may point in generally opposite directions (i.e. have a negative scalar product). In these embodiments, the positive charged species is biased to move in different directions by the electric field and the flow. In the case of an ionised gas as working fluid, this means that the positive ions in the gas are in effect blown away from their corresponding capture electrode 16/17 by the flow and may thus be removed from the device 4 efficiently, while the higher mobility electrons are less affected by the fluid flow and in any case are biased towards their respective capture electrode 16/17 by the fluid flow. In some embodiments, however, the relative orientation of fluid flow and electric field may be reversed.

The performance of the specific embodiment described above with reference to FIG. 1 was characterised by way of illustration by varying the input voltage of the supply 22 between 9 and 12 Volt for a fixed flow rate of 0.1 ml/minute and supply current of 2 A and two loads, which resulted in a varying power dissipated in the load above a threshold input voltage. The output voltage of the supply was approximately 30 kV at the threshold input voltage and approximately 45 kV at the maximum supply input voltage of 12V. Some results are presented in the following table:

| Load (Ohm) | Threshold supply voltage (V) | Power dissipated at thresh. voltage (W) | Power dissipated at max voltage (W) |
|---|---|---|---|
| 10 | 9.6 | 6.4 | 40 |
| 4.7 | 9.7 | 13.6 | 340 |

Specific embodiments have been described above by way of example to illustrate aspects of the disclosure. It will be understood that the scope of the invention is set out in the appended claims. Many modifications and different combinations of features will be apparent to a person having ordinary skill in the art, for example as set out above. Further, it will be appreciated that the order of steps of the method embodiments can be changed as suitable and that some or all of the steps may indeed be carried out in fully or partially overlapping relationship in time. Equally, features of the various embodiments described above may be combined as appropriated. Where the present invention makes reference to charged, positive and negative respectively, species, each species may correspond to a single type of entity (e.g. singly charged positive gas ions and electrons, respectively) or each may comprise sub-species, for example positively charged gas ions with different respective charges. Similar considerations apply to embodiments in which the liquid is a solution with respective ions in solution.

The invention claimed is:

1. A device for converting kinetic energy of a fluid to electrical energy, the device comprising:
    a flow chamber having an inlet port for a fluid and an exhaust port for the fluid;
    a pair of charge collecting electrodes spaced apart from each other along a collection direction and disposed within the flow chamber; and
    an electric field generator configured to generate an electric field in the flow chamber along a field direction to separate charged species in the fluid.

2. A device according to claim 1, wherein the electric field is an ionising electric field to ionise the fluid.

3. A device according to claim 1, wherein the electric field generator comprises a pair of field generating electrodes spaced apart along the field direction and disposed on either side of the flow chamber.

4. A device according to claim 3, wherein the field generating electrodes are electrically isolated from the flow chamber.

5. A device according to claim 1, wherein the field and flow directions are substantially parallel.

6. A device according to claim 1, wherein the collection and flow directions are substantially parallel.

7. A device according to claim 1, wherein the charge collecting electrodes are mesh electrodes.

8. A device according to claim 1, wherein the scalar product of the flow direction and the field direction is negative.

9. A device according to claim 1, wherein the scalar product of the flow direction and the field direction is positive.

10. A device according to claim 1, wherein the fluid is a gas, for example air, Argon or Neon.

11. A device according to claim 1, wherein the fluid is an inert gas.

12. A device according to claim 1, wherein a flow path for the fluid between the inlet port and the exhaust port has a flow direction with a component along the collection direction and a component along the field direction.

13. A device according to claim 12, wherein at least one of:
    the charge collecting electrodes are centred on an axis coinciding with at least a portion of the flow path; and/or
    the flow path passes through the charge collecting electrodes.

14. A method of converting potential energy of a pressurised fluid to electric energy, the method comprising:
    causing the pressurised fluid to flow through a flow chamber along a flow direction, thereby converting the potential energy to kinetic energy of the flowing fluid;
    applying an electric field to the fluid flowing in the flow chamber, the electric field having a field direction with a component along the flow direction, thereby separating positive and negative species of the fluid along the field direction with one of the positive and negative charged species being biased to move in a direction having a component in the flow direction and the other one of the positive and negative charged species being biased to move in a direction having a component in a direction opposite the flow direction;
    collecting at least a fraction of one or each of the positive and negative charged species at a respective current collector; and
    drawing a current from one of the current collectors to provide electrical energy to a load.

15. A method according to claim 14 comprising ionising the fluid by applying the electric field to the flowing fluid to produce an ionised fluid comprising the negative and positive charged species.

16. A method according to claim 15, wherein ionising the fluid comprises generating a plasma.

17. A method according to claim 15, wherein ionising the fluid comprises causing a discharge, for example a dark or corona discharge.

18. A method according to claim 14, the method comprising sensing a quantity indicative of energy dissipated by the load and regulating a rate of flow of the fluid and/or as a function of the quantity indicative of energy dissipated by the load.

19. A method according to claim 14, the method comprising receiving a quantity indicative of energy demand by the load and regulating a rate of flow of the fluid as a function of the quantity indicative of energy demand by the load.

20. A method of converting potential energy of a pressurised fluid to electric energy, the method comprising:
    causing the pressurised fluid to flow through a flow chamber along a flow direction, thereby converting the potential energy to kinetic energy of the flowing fluid;
    applying an electric field to the fluid flowing in the flow chamber with an electric field generator;
    collecting at least a fraction of one or each of the positive and negative charged species at a respective current collector; and
    drawing a current from one of the current collectors to provide electrical energy to a load.

* * * * *